United States Patent
Liu et al.

(10) Patent No.: US 12,155,899 B2
(45) Date of Patent: Nov. 26, 2024

(54) METHOD AND SYSTEM FOR PROCESSING INFORMATION ACROSS BROADCAST PLATFORMS

(71) Applicant: HYTTO PTE. LTD, Singapore (CN)

(72) Inventors: Dan Liu, Guangdong (CN); Jilin Qiu, Guangdong (CN)

(73) Assignee: HYTTO PTE. LTD, Singapore (SG)

( * ) Notice: Subject to any disclaimer, the term of this patent is extended or adjusted under 35 U.S.C. 154(b) by 0 days.

(21) Appl. No.: 17/806,078

(22) Filed: Jun. 8, 2022

(65) Prior Publication Data
US 2023/0403435 A1 Dec. 14, 2023

(51) Int. Cl.
*H04N 21/478* (2011.01)
*H04N 21/2187* (2011.01)
*H04N 21/4788* (2011.01)

(52) U.S. Cl.
CPC ....... *H04N 21/478* (2013.01); *H04N 21/4788* (2013.01); *H04N 21/2187* (2013.01)

(58) Field of Classification Search
CPC .. H04N 21/478; H04N 21/2187; H04L 51/10; H04L 51/56; H04L 51/04
See application file for complete search history.

(56) References Cited

U.S. PATENT DOCUMENTS

| | | | | |
|---|---|---|---|---|
| 8,608,644 | B1* | 12/2013 | Davig | A61F 5/00 600/38 |
| 9,762,515 | B1* | 9/2017 | Olivares | G06Q 20/18 |
| 10,616,666 | B1* | 4/2020 | Pontiff | H04N 21/8545 |
| 11,122,003 | B1* | 9/2021 | Garg | H04L 51/046 |
| 2007/0162930 | A1* | 7/2007 | Mickle | H04L 41/5054 348/E7.071 |
| 2008/0010122 | A1* | 1/2008 | Dunmire | H04L 65/611 348/E7.071 |

(Continued)

FOREIGN PATENT DOCUMENTS

WO   WO 2021185302 A1   9/2021

OTHER PUBLICATIONS

Tassi, Paul. "'Fortnite' Legend Dr. Lupo Pulls off a Record-Breaking Charity Stream Raising Nearly $1M." Forbes, forbes.com/sites/paultassi/2019/06/23/fortnite-legend-drlupo-pulls-off-a-record-breaking-charity-stream-raising-nearly-1m/?sh=5d72a4205dc4. Jun. 23, 2019 (Year: 2019).*

(Continued)

*Primary Examiner* — Michael R Telan
(74) *Attorney, Agent, or Firm* — F. Chau & Associates, LLC

(57) ABSTRACT

A method for processing communication across multiple broadcast platforms includes connecting a content creator device to a plurality of broadcast platforms. A chat container is provided in a user interface of the content creator device. The chat container is configured to provide centralized information management across each of the plurality broadcast platforms. One or more broadcast platforms of the plurality of broadcast platforms are selected as a target broadcast platform in response to a selection operation on the chat container. A content creator message is sent to at least one viewer device among the plurality of viewer devices in response to a messaging operation on the chat container. The at least one viewer device is in communication with the content creator device via the target broadcast platform.

25 Claims, 9 Drawing Sheets

(56) References Cited

U.S. PATENT DOCUMENTS

| | | | | |
|---|---|---|---|---|
| 2008/0249818 | A1* | 10/2008 | Olliphant | G06Q 20/386 |
| | | | | 705/39 |
| 2011/0078718 | A1* | 3/2011 | Jakobi | H04N 21/4828 |
| | | | | 725/35 |
| 2015/0212984 | A1* | 7/2015 | Bowden | G06Q 50/01 |
| | | | | 715/234 |
| 2017/0085600 | A1* | 3/2017 | Carter | H04L 65/1089 |
| 2017/0337274 | A1* | 11/2017 | Ly | H04M 1/7243 |
| 2018/0260796 | A1* | 9/2018 | McDonald | H04L 65/60 |
| 2018/0337796 | A1* | 11/2018 | Pavlin | H04L 12/1813 |
| 2020/0068262 | A1* | 2/2020 | Saldana | H04N 21/8173 |
| 2020/0276504 | A1* | 9/2020 | Liu | A61H 19/32 |
| 2020/0364727 | A1* | 11/2020 | Scott-Green | G06Q 10/0635 |
| 2021/0043187 | A1* | 2/2021 | Ahn | H04N 21/2187 |
| 2023/0132073 | A1* | 4/2023 | Zheng | H04N 21/4788 |
| | | | | 705/26.1 |

OTHER PUBLICATIONS

Macdonald, Barbara. "Can we chat? Hello Super Chat!" YouTube Official Blog, blog.youtube/news-and-events/can-we-chat-hello-super-chat/. Jan. 12, 2017 (Year: 2017).*

"Making Money on YouTube with Super Chat and Stickers." YouTube, uploaded by YouTube Creators, Aug. 19, 2021, youtube.com/watch?v=KDZJULNpVWo (Year: 2021).*

"Lovense Developer" online publication at https://developer.lovense.com/#introduction printed on Jun. 8, 2022, last updated Jun. 6, 2022.

* cited by examiner

Fig. 5

| TIP HISTORY WINDOW | | | | | |
|---|---|---|---|---|---|
| Per Time Frame | | | | | |
| Total: | $125 | $220 | $1,240 | $1,170 | $12,395 |
| | | | | | |
| BP1: | $20 | $35 | $240 | $300 | $3,100 |
| BP2: | $40 | $55 | $300 | $265 | $2,800 |
| BP3: | $30 | $70 | $290 | $280 | $2,955 |
| BP4: | $35 | $60 | $410 | $325 | $3,540 |

Fig. 6

| | USER RECORDS WINDOW | | |
|---|---|---|---|
| RANK | BP | USERNAME | Total Tips Score |
| 1 | BP1 *[VIP]* | RALPH_75 | 4301 |
| 2 | BP4 | CARLOS$1 | 3878 |
| 3 | BP3 | TWINZ_10 | 1092 |
| 4 | BP3 *[VIP]* | ERLGRY88 | 312 |
| 5 | BP2 | FPG_1976 | 190 |

Fig. 7

CONTAINER WINDOW

[BP1] [BP2] [BP3] [BP4]　　　[FONT]　　　　　　　　　　　　　　　　[X]

18min　[BP2] FPG_1976 (45 today, 190 total)
　　　　Thank you for saying that.

15min　[BP1] RALPH_75 (210 today, 4301 total)
　　　　Where does the time go?

7min　　[BP3] DUK_HUNT3R (21 today, 21 total)
　　　　Nice to meet you.

6min　　[BP3] DUK_HUNT3R (21 today, 21 total)
　　　　[CTRL_CMD 04]

[BP1] Me
　　　　　　　　　　　　　　　　　　　　　　See you again tomorrow?

[BP3] Me
　　　　　　　　　　　　　　　　　　　　　　[DUK_HUNT3R] [CTRL-CMD 02]

| 1st BP | 2nd BP | 3rd BP | 4th BP | ALL |

[　　　　　　　　　　　　　　　　　　　　　　　　　　　SEND ]

METHOD AND SYSTEM FOR PROCESSING INFORMATION ACROSS BROADCAST PLATFORMS

TECHNICAL FIELD

The present disclosure relates to broadcast platforms and, more specifically, to a method and system for processing information across broadcast platforms.

DISCUSSION OF THE RELATED ART

Adult toys are devices designed for sexual stimulation of a user. Adult toys may be able to produce a wide range of movements, referred to herein as "operational modes." These operational modes can provide sexual stimulus by various movements such as vibrations and other repetitive movements.

Traditionally, a user has been responsible for manually activating the adult toy device and switching between its many operational modes. More recently, adult toys have been designed that allow for remote control over a computer network such as the Internet to allow a remote user to control the operational modes of the adult toy being used by a local user.

More recently, the use of these adult toys has been incorporated into the broadcasting/streaming of real-time content and the remote control of these adult toys may be passed to one or more viewers of the content.

U.S. Pat. No. 9,762,515, which is incorporated by reference herein in its entirety, relates to a system and method for allowing one or more viewers to remotely interact with content creators, for example, by enabling the viewers to provide monetary tips to the content creator during online video chat sessions, wherein the content creator may pre-define tipping parameters by which a viewer may initiate one or more operational modes of the adult toy based on an amount of tip provided.

The adult toy can be Wi-Fi or Bluetooth enabled to receive commands directly from a remotely hosted server that administers the operational modes of the adult toy via a web browser extension, a website hosting an online video chat session, or the adult toy may be connected, via Wi-Fi or Bluetooth, to an application installed on a device operated by the content creator, such as a personal computer (PC), smart phone, tablet computer, etc. The application may communicate with the web browser extension to relay commands to the adult toy therefrom. In this way, the browser extension or website can generate live control links to enable certain viewers to exert real-time control over the operational modes of the adult toy.

Content creators may wish to simultaneously broadcast their live streams across multiple platforms. However, as each platform may have its own user interface, the task of interacting with the viewers of each platform can be distracting as the content creator must juggle viewer interactions across multiple different user interfaces.

SUMMARY

A method for processing communication across multiple broadcast platforms includes connecting a content creator device to a plurality of broadcast platforms. At least a first viewer device, of a plurality of viewer devices, is connected to a first broadcast platform of the plurality of broadcast platforms. At least a second viewer device, of the plurality of viewer devices, is connected to a second broadcast platform of the plurality of broadcast platforms. A chat container is provided in a user interface of the content creator device. The chat container is configured to provide centralized information management across each of the plurality broadcast platforms. One or more broadcast platforms of the plurality of broadcast platforms are selected as a target broadcast platform in response to a selection operation on the chat container. A content creator message is sent to at least one viewer device among the plurality of viewer devices in response to a messaging operation on the chat container. The at least one viewer device is in communication with the content creator device via the target broadcast platform.

The method may further include displaying, through the chat container, viewer information from the plurality of broadcast platforms, wherein the viewer information is associated with at least one viewer device in communication with the content creator device via at least one of the plurality of broadcast platforms.

The content creator device may be configured to broadcast a video stream and send content creator messages to the plurality of viewer devices via at least one of the plurality of broadcast platforms. The viewer device may be configured to watch the broadcasted video stream and send the viewer information to the content creator device via at least one of the plurality of broadcast platforms.

The viewer information may include comment messages, private messages, tipping messages, and/or statistical data. The comment message may include a viewer ID, comment content, comment time, and/or a name of a broadcast platform, among the plurality of broadcast platforms, via which the comment message is sent. The tipping message may include the viewer ID, a tipping value, a tipping time, and/or the name of the broadcast platform, among the plurality of broadcast platforms, via which the tipping message is sent. The statistical data may include a number of viewer devices of the plurality of viewer devices, tipping statistics for a particular broadcast platform of the plurality of broadcast platforms, tipping statistics for a particular viewer device, of the plurality of viewer devices, and/or identity information for a particular viewer device, of the plurality of viewer devices.

The method may further include sending a reply message from the content creator device to the at least one viewer device, of the plurality of viewer devices, and synchronously showing the reply message, in a broadcast platform of the plurality of broadcast platforms, via which the at least one viewer is in communication with the content creator device, in response to a reply operation on the comment message or the tipping message in the chat container.

The viewer information may further include an indication that a viewer device, of the plurality of viewer devices, is associated with a peripheral device.

The peripheral device may be an adult toy. The adult toy may be connected to the viewer device by a wired or wireless connection. The indication may include information pertaining to whether the wired or wireless connection is operational and/or information pertaining to a type of the adult toy.

The chat container may be presented as a floating window on a web page, as an embedded element in a web page, and/or as an independent client application.

Each of the plurality of broadcast platforms may be separately displayed on different web pages, and the chat container may be presented in one of the web pages for a particular broadcast platform.

The step of selecting one or more broadcast platforms as the target broadcast may include, based on the target broadcast platform and the content creator message, calling a preprogrammed script to simulate an input operation on a web interface associated with the target broadcast platform, so as to send the content creator message to the target broadcast platform or sending the content creator message from the chat container to the target broadcast platform based on a software development kit which interfaces the chat container with the target broadcast platform, wherein the software development kit is integrated into a development of the target broadcast platform.

The step of displaying, through the chat container, viewer information from the plurality of broadcast platforms may include, responsive to receiving front-end data from the plurality of broadcast platforms, processing the front-end data to obtain the viewer information to be displayed through the chat container, or receiving the viewer information from the at least one of the plurality of broadcast platforms to the chat container based on a software development kit which interfaces the chat container with the target broadcast platform, wherein the software development kit is integrated into a development of the at least one of the plurality of broadcast platforms.

The method may further include performing information conversion on the viewer information in the chat container, wherein the information conversion includes text-to-voice, voice-to-text, translation, and/or voice prompt.

A system for communication across multiple broadcast platforms includes a control server for connecting to a first broadcast platform, a second broadcast platform, and generating a chat container. A content creator terminal displays the chat container, receives a content creator message and a selection of a target broadcast platform from among the first and second broadcast platforms, generates a live stream broadcast, transmits the live stream broadcast to each of the first and second broadcast platforms, and transmits the content creator message to the target broadcast platform. A first viewer terminal is connected to the first broadcast platform and is configured to receive the generated live stream broadcast therethrough. A second viewer terminal is connected to the second broadcast platform and is configured to receive the generated live stream broadcast therethrough.

The system may further include a database connected to either the control server or the content creator terminal and configured to store and retrieve information pertaining to the first viewer terminal and/or the second viewer terminal and provide the retrieved information to the content creator terminal for display.

The system may further include an adult toy connected to the content creator terminal via a wired or wireless connection and configured to be controlled by either by the first viewer terminal via the first broadcast platform and the control server or by the second viewer terminal via the second broadcast platform and the control server.

The system may further include an adult toy connected to either the first viewer terminal or to the second viewer terminal via a wired or wireless connection and configured to be controlled by the content creator terminal either by the first viewer terminal via the first broadcast platform and the control server or by the second viewer terminal via the second broadcast platform and the control server.

A non-transitory computer-readable medium storing a program including instructions that, when executed by a processor, causes communication to be processed across multiple broadcast platforms, by connecting a content creator device to a plurality of broadcast platforms, connecting at least a first viewer device, of a plurality of viewer devices, to a first broadcast platform of the plurality of broadcast platforms, connecting at least a second viewer device, of the plurality of viewer devices, to a second broadcast platform of the plurality of broadcast platforms, providing a chat container in a user interface of the content creator device, wherein the chat container is configured to provide centralized information management across each of the plurality broadcast platforms, responsive to a selection operation on the chat container, selecting one or more broadcast platforms of the plurality of broadcast platforms as a target broadcast platform, and responsive to messaging operation on the chat container, sending a content creator message to at least one viewer device among the plurality of viewer devices, wherein the at least one viewer device is in communication with the content creator device via the target broadcast platform.

The instructions, when executed by the processor, may further cause displaying, through the chat container, viewer information from the plurality of broadcast platforms, wherein the viewer information is associated with at least one viewer device in communication with the content creator device via at least one of the plurality of broadcast platforms.

The instructions, when executed by the processor, may further cause the content creator device to be configured to broadcast a video stream and send content creator messages to the plurality of viewer devices via at least one of the plurality of broadcast platforms, and the viewer device is configured to watch the broadcasted video stream and send the viewer information to the content creator device via at least one of the plurality of broadcast platforms.

The viewer information may include comment messages, private messages, tipping messages, and/or statistical data. The comment message may include a viewer ID, comment content, comment time, and/or a name of a broadcast platform, among the plurality of broadcast platforms, via which the comment message is sent. The tipping message may include the viewer ID, a tipping value, a tipping time, and/or the name of the broadcast platform, among the plurality of broadcast platforms, via which the tipping message is sent. The statistical data may includes a number of viewer devices of the plurality of viewer devices, tipping statistics for a particular broadcast platform of the plurality of broadcast platforms, tipping statistics for a particular viewer device, of the plurality of viewer devices, and/or identity information for a particular viewer device, of the plurality of viewer devices.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 5 is a flow chart illustrating an approach for processing information across broadcasting platforms in accordance with exemplary embodiments of the present disclosure;

FIG. 6 is a simplified example of a user records window in accordance with exemplary embodiments of the present invention;

FIG. 7 is a chat container window in accordance with exemplary embodiments of the present invention;

DETAILED DESCRIPTION OF THE DRAWINGS

Figure 1:
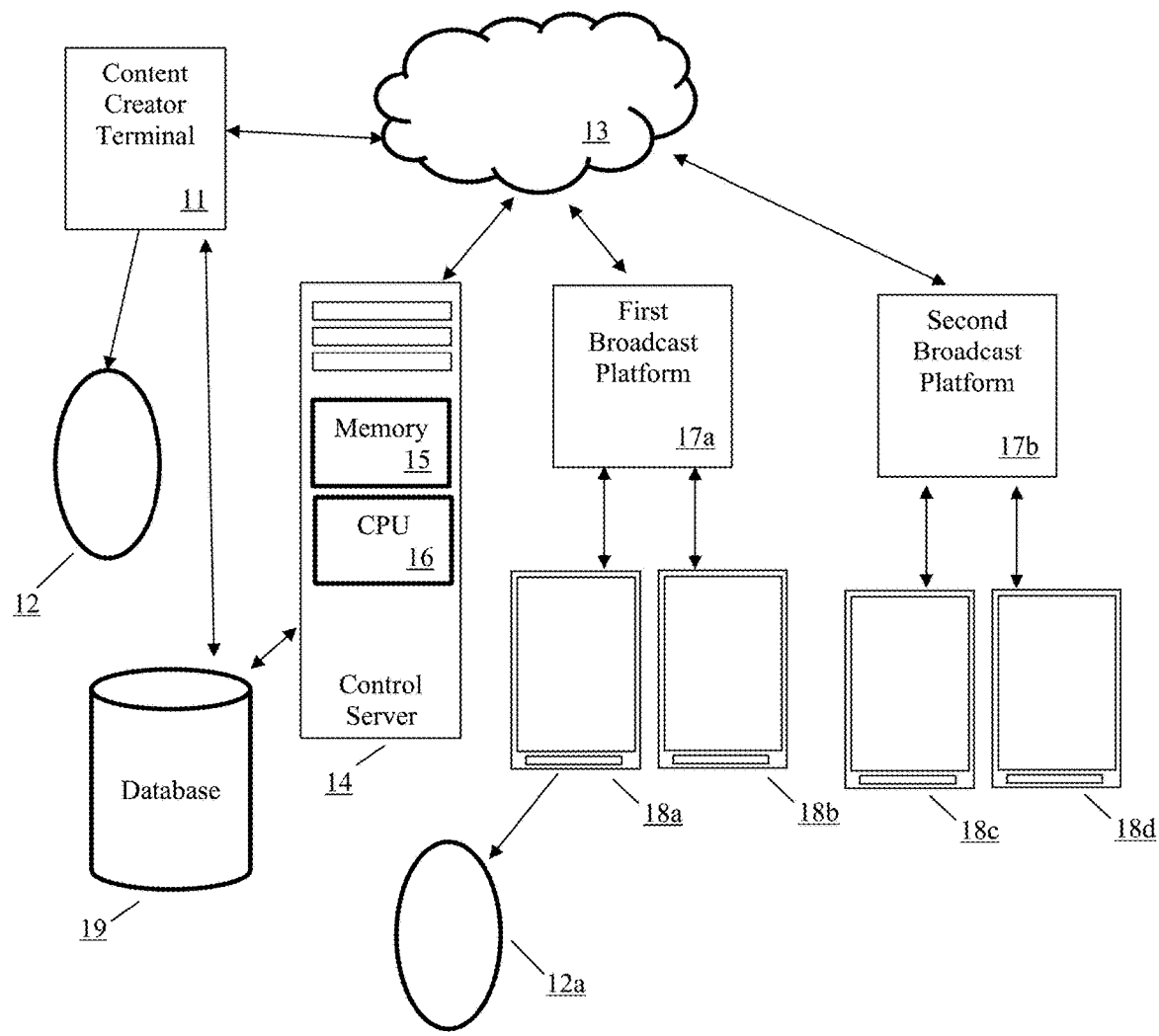
FIG. 1 is a schematic diagram illustrating a system for processing information across broadcasting platforms in accordance with exemplary embodiments of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention relate to systems and methods for effectively managing viewer interactions across multiple diverse broadcasting/live streaming platforms so that a content creator may perform viewer engagement functions within a single consolidated user interface that allows for chatting, the reception of monetary tips, and the remote control of operational modes of an adult toy, among other engagement functions.

As used herein, a user engaged in the performance of the live stream/broadcast may be referred to as a content creator, although it is to be understood that this user may be a performer, model, etc., and the actions described herein as those of the content creator may be divided among multiple different users.

As used herein, users engaged in the viewing of the live stream/broadcast may be referred to as viewers, although they may also contribute to the performance in some manner such as by controlling the operational modes of an adult toy being used by the content creator.

FIG. 1 is a schematic diagram illustrating a system for processing information across broadcasting platforms in accordance with exemplary embodiments of the present disclosure. A content creator may utilize a content creator terminal 11, which may be a computing device such as a personal computer (PC), a mobile device such as a smartphone, a tablet computer, or a teleconferencing system. The content creator terminal 11 may access a control server 14 across a computer network 13, such as the Internet. The control server 14 may manage communications between the content creator terminal 11 and a plurality of broadcast platforms (shown here as including a first broadcast platform 17a and a second broadcast platform 17b). Each broadcast platform 17 (where 17={17a, 17b, . . . }) may be a streaming platform or social network platform offering live streams, such as YOUTUBE LIVE offered by Alphabet, Inc., INSTAGRAM LIVE or FACEBOOK LIVE offered by Meta Platforms, Inc., TWITCH offered by Amazon, Inc., TIK-TOK offered by ByteDance, etc.

Various viewer terminals 18 (where 18={18a, 18b, 18c, 18d, . . . }) may be connected to one of the broadcast platforms 17. For example, a first viewer terminal 18a and a second viewer terminal 18b are connected to the first broadcast platform 17a and a third viewer terminal 18c and a fourth viewer terminal 19d are connected to the second broadcast platform 17b. These connections may also be over a computer network 13, such as the Internet.

Rather than the content creator terminal 11 being separately connected to each of the broadcast platforms 17, the content creator terminal is configured to display a chat container managed by the control server 14. The control server 14 may therefore manage a session for each of the broadcast platforms 17 and gather messages from each of the broadcast platforms 17 and display them on the content creator terminal 11 within the chat container. Similarly, the chat container may be used by the content creator terminal 11 to select one or more target broadcast platforms, from among the broadcast platforms 17, receive a message, and send that message to the selected broadcast platforms so that the chat container, under the management of the control server 14, may organize and display communications from among the plurality of broadcast platforms within a singular user interface.

The control server 14 may include, for example, a central processing unit (CPU) 16 and system memory 15. However, the control server 14 may be a same device as the content creator terminal 11. A database 19, that is connected to either the content creator terminal 11 or the control server 14, may store and retrieve information pertaining to the various viewer terminals 18 (or user accounts thereof) so that a synopsis of each viewer terminal 18 may be displayed in conjunction with their messages within the chat container or in a separate window. This information may include data such as a viewer's name, tips given, and other details and preferences that may facilitate the content creator's interaction with that viewer.

According to one approach, the content creator terminal 11 may be directly logged in to each of the broadcast platforms 17 and the control server 14 may access the broadcast platforms 17 via the connection established by the content creator terminal 11. However, according to another approach, the control server 14 may be directly logged in to each of the broadcast platforms 17, on behalf of the content creator, and the content creator terminal 11 may access the broadcast platforms 17 via the control server 14.

However, regardless of the manner of connection, messages from each of the viewer terminals 18, via each of the broadcast platforms 17, are consolidated within the chat container and the chat container may also be used to select a target broadcast platform and send an input message to the target broadcast platform. In this way, the chat container provides the content creator with a consolidated user interface for simultaneously interacting with multiple viewers across multiple different broadcast platforms.

A first adult toy 12 may be connected to the content creator terminal 11 via a wired or wireless connection. Examples of suitable wireless connections include Wi-Fi, Bluetooth, NFC, Zigbee, etc. Control of the operational modes of the first adult toy 12 may be remotely provided by one of the viewer terminals via the corresponding broadcast platform 17, the computer network 13, and, in some instances, the control server 14. The chat container may display to the content creator which viewer has initiated which operational mode to the first adult toy 12 and the content creator may also use the chat container to allow and deny operational control of the first adult toy 12 by a desired viewer.

Similarly, a second adult toy 12a may be connected to one of the viewer terminals 18a via a similar wired or wireless connection and control of the operational modes of the second adult toy 12a may be granted to the content creator, via the chat container.

The Control Server 14 may access each of the broadcast platforms 17 either by a software development kit and/or one or more APIs thereof, so that viewer messages may be retrieved for incorporation into the chat container and content creator messages, entered into the chat container, may be entered into the target broadcast platform.

Alternatively, where no software development kit is provided, the Control Server 14 may run various preprogramed scripts to simulate human interaction with each of the broadcast platforms 17 to perform the same functions.

These preprogrammed scripts may be embodied as JavaScript files, e.g., as different node.js files targeted on different third-party broadcast platforms using different rules of regular expression (like a Web crawler). Some examples of preprogrammed scripts are provided below:
receiveTip Call this method when the model receives a tip in the chat room of the third-party broadcast platform. The chat container will receive, sort out, and display the information according to these parameters:

/**
   *receiveTip
   *@param {number} amount /tip amount that the model receives
   *@param {string} tipperName /this is the tipper's Screen Name
   */
   camExtension.receiveTip(amount, tipperName)
receiveMessage Call this method when the model receives a message in the chat room of the third-party broadcast platform. The chat container will receive, sort out, and display the information according to these parameters:

/**
   *receiveMessage
   *@param {string} userName /the sender's Screen Name
   *@param {string} content /the message just sent by the sender
   */
   camExtension.receiveMessage(userName, content)
sendMessage Call this method when the model sends or replies message to different platform. The chat container will forward the information according to these parameters:

/**
   *sendMessage
   *@param {string} platformName the selected platform's Name
   *@param {string} content /the message just sent by the sender
   */
   camExtension.sendMessage(platformName, content)

Figure 2:
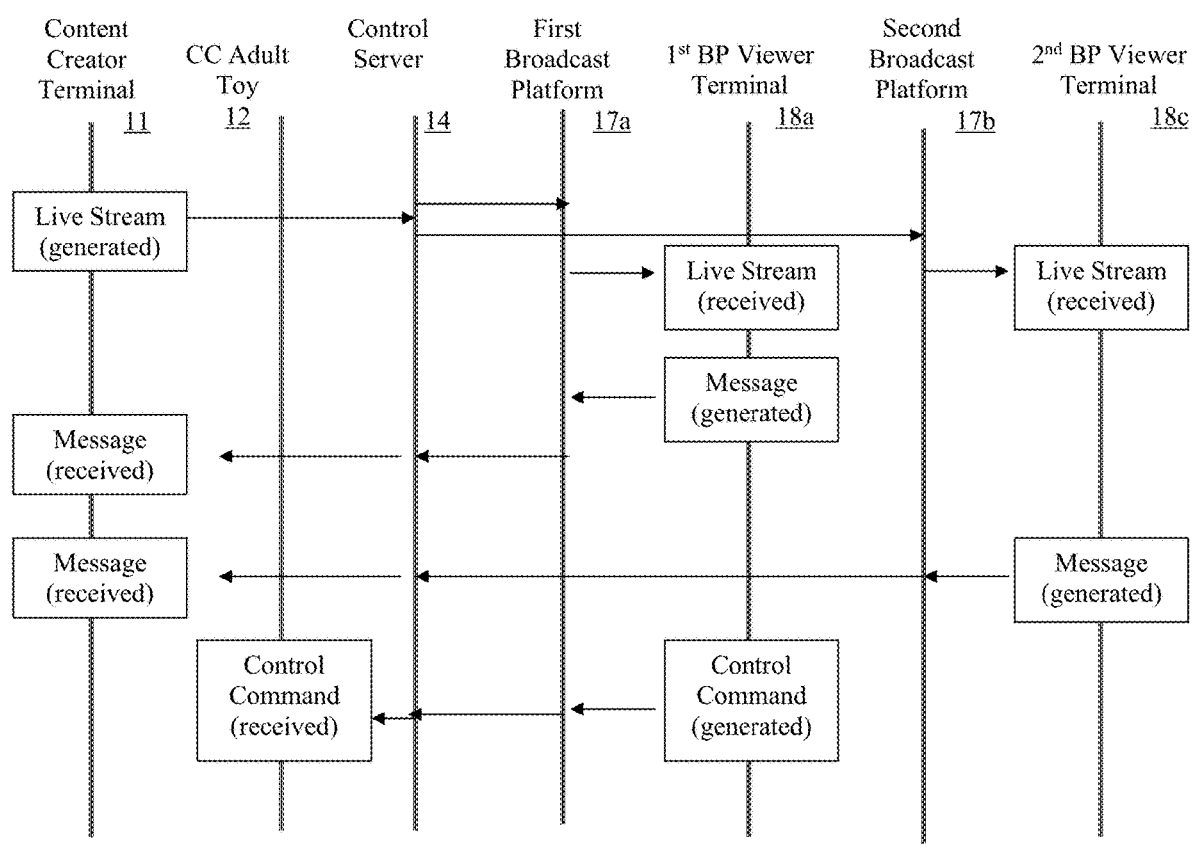
FIG. 2 is a diagram illustrating a way in which messages may be passed according to the above-described communications system.

FIG. 2 is a diagram illustrating a way in which messages may be passed according to the above-described communications system. The content creator terminal 11 may generate a live stream and send that live stream to the control server 14 which, by virtue of managing sessions with broadcast platforms, may send the live stream to each of the first 17a and second 17b broadcast platforms where they would be viewed by the first 18a and second 18c viewer terminals, respectively.

When a message is generated in one of the viewer terminals, for example, the first broadcast platform viewer terminal 18a, that message is sent, via the corresponding broadcast platform 17a to the control server 14, where it is inserted into the chat container displayed on the content creator terminal 11. Where a message is generated in the second broadcast platform viewer terminal 18c, that message may pass through the second broadcast platform 17b to the control server 14, where it is inserted into the chat container displayed on the content creator terminal 11.

A message created within the chat container selecting one or more broadcast platforms as target, may be sent from the content creator terminal 11 to the control server 14, to the targeted broadcast platform. If the message is a private message, it may be sent only to a particular viewer within the target broadcast platform and so an option to select a target viewer may also be provided by the chat container for use with private messages. As used herein, messages may be understood to be multimedia messages and may include text, emoji, images, audio files, video files, and also control commands for adult toys.

As the content creator may have one or more adult toys associated with the content creator device and as one or more of the viewers may have adult toys associated with their respective devices, the chat container may be used by the content creator to both issue control commands to activate the various operational modes of the viewer's adult toys, or to see in text form, which viewers have sent which control commands to the content creator's adult toy. Each control command may be displayed in the form of a message within the chat container and the content creator may use the message generation feature of the chat container to issue a control command to operate a desired adult toy of a desired viewer in a desired operational mode. The control commands, so entered, may be interpreted by the control server and the control server may then activate the operational modes of the desired viewer's adult toy via a means of remote operation specific to the type of adult toy being remotely operated, for example, by the control server passing a command along to another remote server responsible for the remote control of adult toys. Similarly, the control server may keep track of how the content creator's adult toy is being activated by viewers and then represent these actions as control commands within the chat container.

In allowing for the content creator to control the operational modes of the adult toys of the viewers, the chat container may additionally provide a pulldown or popup menu of operational modes for the adult toy of each viewer who has such a connected device associated with their terminal/device. The control server may also arbitrate remote access of the content creator's adult toy according to a set of rules, such as a required minimum tip value for implementing each operational mode of each adult toy. The content creator may see this set of rules and may make adjustments thereto using the chat container or a related window.

For example, the first broadcast platform viewer terminal 18a may generate a control command which may be relayed through the first broadcast platform 17a and the control server 14 and may then be sent to the adult toy 12 (either directly through the control server 14, as shown, or via the content creator terminal 11).

It is noted that where the broadcast platform sessions are managed by the content creator terminal 11 directly, the control server 14 may send and receive all its messages and commands via the content creator terminal 11.

Figure 3:
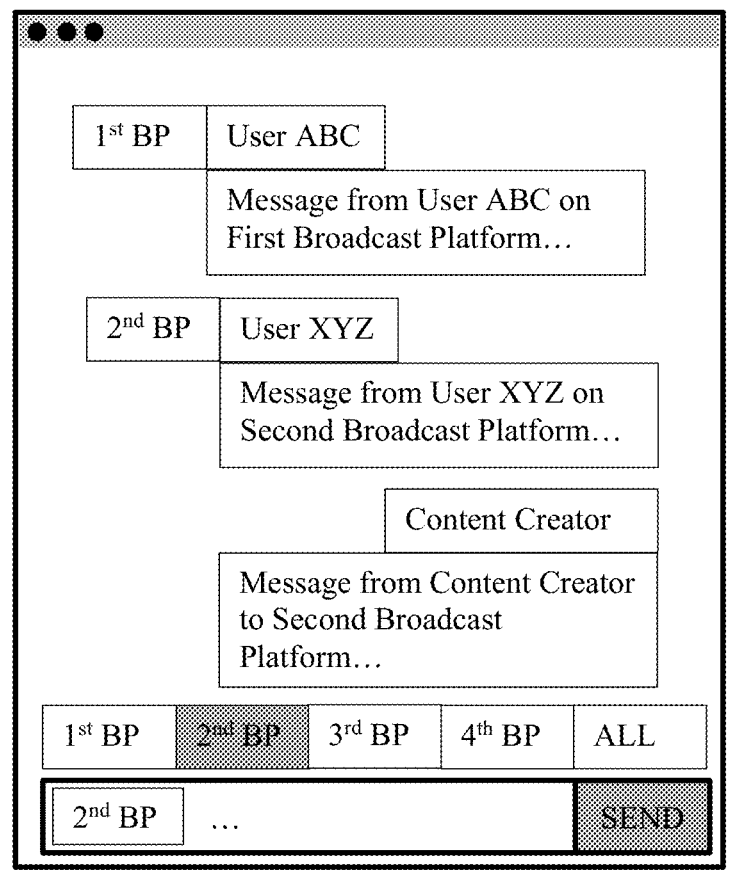
FIG. 3 is a diagram illustrating a chat container according to an exemplary embodiment of the present invention.

FIG. 3 is a diagram illustrating a chat container according to an exemplary embodiment of the present invention. As can be seen from this figure, the chat container provides the content creator with a consolidated view of messages from different users of different broadcast platforms and also provides the content creator with a means of selecting a target broadcast platform so that a message may be generated and sent to the target broadcast platform via input within the chat container. The chat container may further provide options for sending multimedia messages such as images, sounds, video, and adult toy controls via the chat container and these multimedia messages may also be sent as private messages to individual users.

Figure 4:
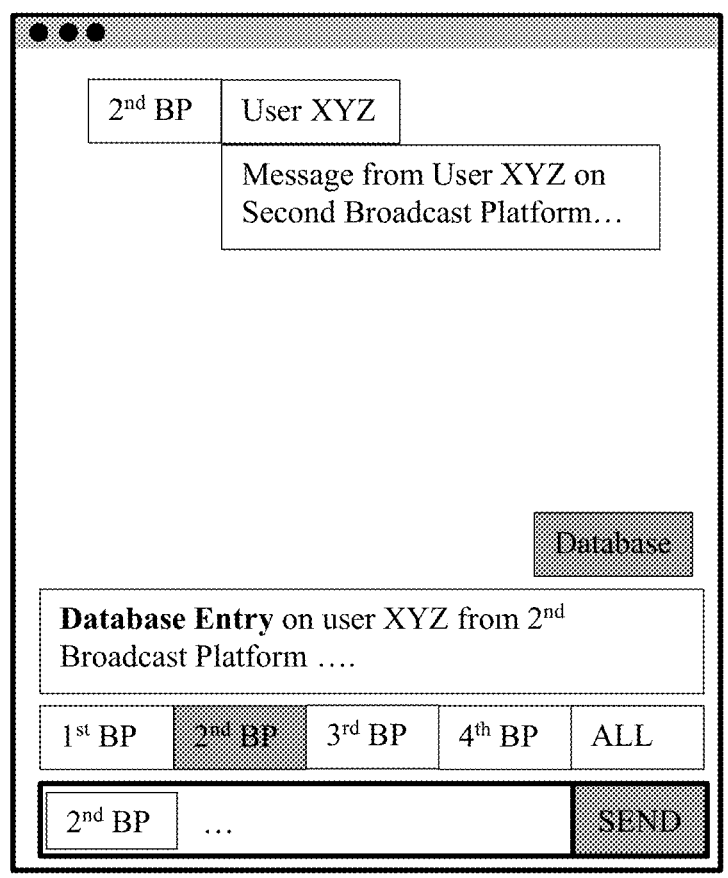
FIG. 4 is a diagram illustrating a chat container according to an exemplary embodiment of the present invention.

FIG. 4 is a diagram illustrating a chat container according to an exemplary embodiment of the present invention. As can be seen from this figure, the chat container further provides a display of a database entry for a selected viewer. The chat container may further provide a means of entering information into the database, for example, by selecting a database button and a particular viewer so that the text box may be used to store new information into the database entry for that viewer. The chat container, or another element running on the control server 14, may also automatically store data retrieved from respective broadcast platforms, to the database, such as personal information, tips given, preferences, etc.

The database may additionally be used to store a history of tips given by each broadcast platform and/or by each viewer. The tip history may be loaded from the database from the content creator UI and displayed within the content creator UI, either within the chat container or within a separate window. FIG. 5 is a diagram illustrating a tip history window in accordance with exemplary embodiments of the present invention. As may be seen from this diagram, a tip history may be organized by broadcast platform and may show tips earned per platform during a predefined time frame. so that the content creator may more easily visualize tip earnings across multiple broadcast platforms, within a singular window.

The database may additionally be used to store records of viewers including the identity of VIP users, a number, unique ID or usernames, IP addresses, broadcast platforms, chat rooms, broadcast rooms, etc. and this information may be recalled from the database and displayed either within the chat container or within a separate window. For example, the chat container may display all desired information within the content creator UI, both for a current broadcast session and overall. This information may therefore be displayed within a single window, across all broadcast platforms, for example, without having to interact with another user interface or pressing redundant buttons. FIG. 6 is a simplified example of a user records window in accordance with exemplary embodiments of the present invention. As can be seen from this window, all active viewers may be displayed by user name along with an iconic indication of which broadcast platform each user is viewing from. An icon may also be used to show VIP status, which may be achieved in any desired manner, such as by subscription, and a participation score that may be based, for example, by cumulative tips given across multiple broadcast platforms (such as a ranking list showing top 5 tippers across platforms). As this information is all tallied and stored within the database, and is not stored within the individual broadcast platforms, the information therein may be summed across all broadcast platforms.

FIG. 7 is a chat container window in accordance with exemplary embodiments of the present invention. As may be seen herein, the content creator may select from a dropdown list of broadcast platforms represented by icons and may then proceed to type and send a desired message. In this way, the dropdown list may be used to select the target broadcast platform, as discussed above. A total of tips or tokens per broadcast platform may be displayed above the text window and above that, a chat history across broadcast platforms may be displayed. The chat history may be color coded and/or may show an icon to represent the broadcast platform the message originated from. Viewer usernames may also be associated with each message, as well as a brief tipping history, such as a total amount of tips given that day and overall.

Figure 8:
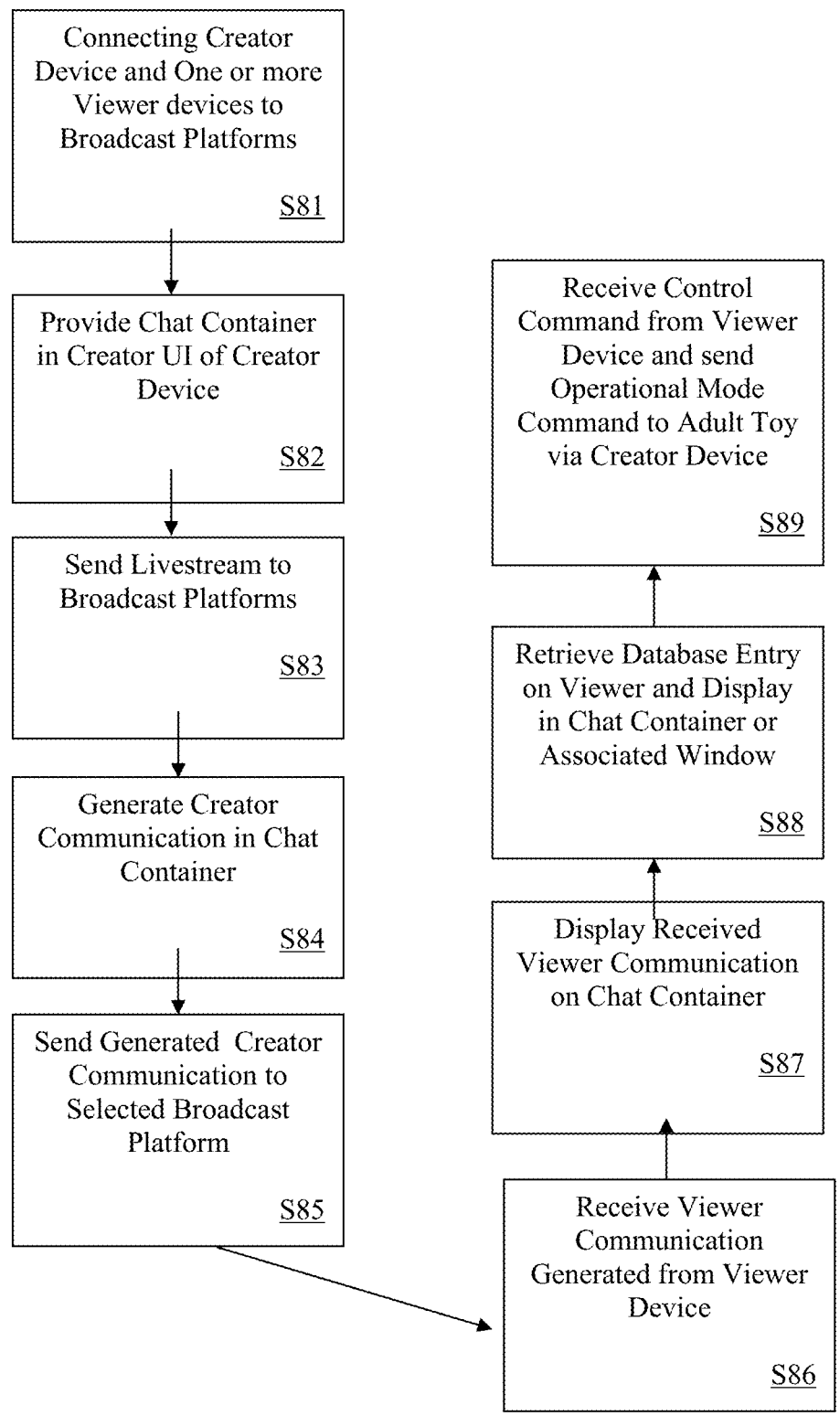
FIG. 8 is a flow chart illustrating an approach for processing information across broadcasting platforms in accordance with exemplary embodiments of the present disclosure.

FIG. 8 is a flow chart illustrating an approach for processing information across broadcasting platforms in accordance with exemplary embodiments of the present disclosure. First, the creator terminal (referred to here as the "creator device") may be connected to one or more viewer terminals (referred to here as the "viewer devices"), via multiple broadcast platforms, for example, in the arrangement described above (Step S81). Then, a chat container may be provided within a creator user interface (UI) of the creator device (Step S82). Next, the creator device may generate a live stream and the live stream may be sent to each of the broadcast platforms for simultaneous display (Step S83). The content creator may generate a multimedia message within the chat container (Step S84) and this multimedia message may be sent to target broadcast platform(s) (Step S85) where they may be observed by the respective viewers.

The viewers may also generate multimedia messages using the viewer devices and these messages may be received (Step S86) and then displayed within the chat container (Step S87). Database entries relating to one or more viewers may be retrieved, either by the request of the content creator, or automatically in association with a viewer message, and then displayed either within the chat container or an associated window (Step S88). A control command for an operational mode of an adult toy may be received from a user via a corresponding broadcast platform and the control command may then be sent by a local wired or wireless connection from the content creator device to the adult toy (Step S89).

It is noted that in the approaches described above, the content creator is able to more easily see communications across multiple broadcast platforms and send communications to target broadcast platforms, thereby allowing the content creator to conduct simultaneous but separate conversations across multiple broadcast platforms. However, according to another approach, the control server may implement a chat relay mode in which a communication made by a viewer within a first broadcast platform is reproduced within the other broadcast platforms and communications made by the content creator are sent to all broadcast platforms so that the viewers of all broadcast platforms can see messages sent by viewers of other broadcast platforms, thereby creating a single discussion group across multiple broadcast platforms. This may be performed, for example, by the control server receiving a message sent by a viewer in one broadcast platform and then automatically posting that same message, along with an indication of who generated that message and which broadcast platform the message was generated on, to the other broadcast platforms, through the user account of the content creator.

As discussed above, the content creator and/or one or more of the viewers may have adult toys or other related devices connected to their respective terminal devices. Thus, according to one approach, the content creator may have remote control over the operational modes of an adult toy or other peripheral of one or more users. Information related to which adult toys or peripherals are accessible to the content creator may additionally be displayed within the chat container and/or stored within the database. The chat container may, for example, display an icon next to a viewer's username to represent that an adult toy or peripheral is accessible to the content creator and what type of adult toy or peripheral it might be. This display may also indicate whether the adult toy or other peripheral is currently accessible to the content creator and what operational modes are available. The content creator may be able to control the adult toy or peripheral directly from the chat container, or may use the chat container to open a new window for adult toy/peripheral operational mode control. While the adult toy may be any device for providing sexual stimulation to a user, the peripheral may be any remotely accessible smart device or Internet of Things device, such as smart lights, music, climate control devices, etc.

It is noted that the chat container, while being principally text and icon based, may also incorporate text-to-speech capabilities to allow the content creator to listen to the incoming messages read aloud and may also incorporate speech-to-text capabilities to allow the content creator to dictate new messages. The content creator may also be able to dictate one or more control commands to control an adult toy/peripheral of a user, or perform any other function mentioned herein as being associated with the present disclosure, by voice command.

Figure 9:
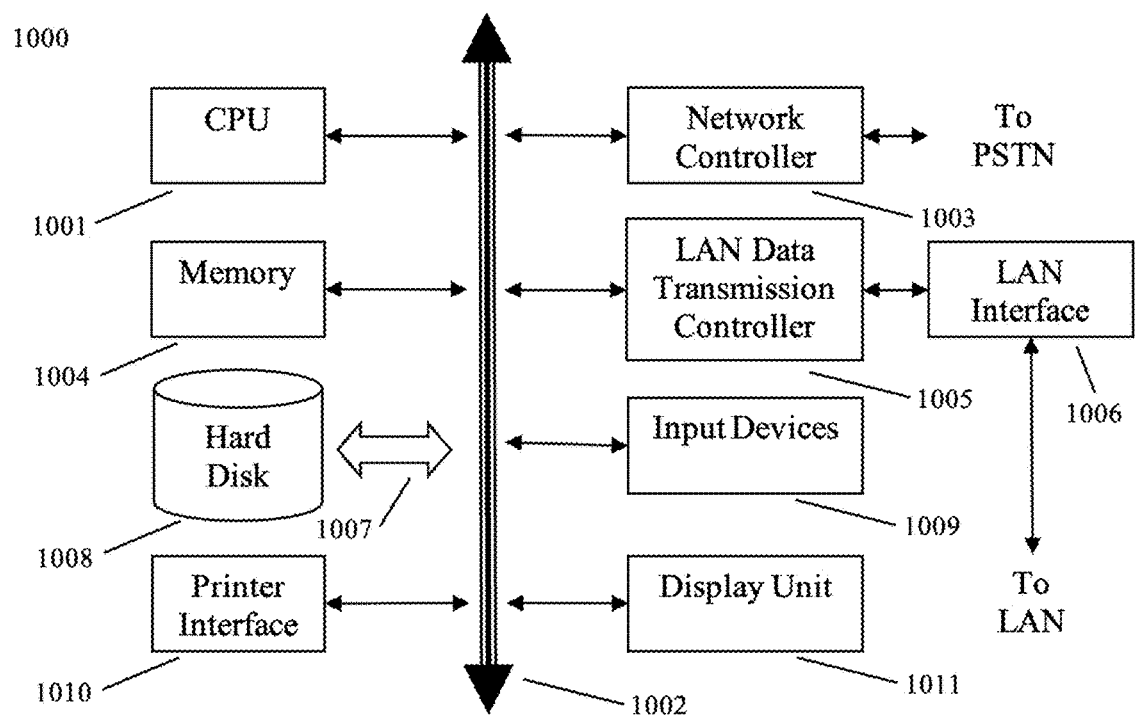
FIG. 9 shows an example of a computer system capable of implementing the method and apparatus according to embodiments of the present disclosure.

FIG. 9 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for processing communication across multiple broadcast platforms, including:

providing a chat container in a user interface of a content creator device, wherein the chat container is configured to provide centralized information management across a plurality of broadcast platforms, and wherein at least a first viewer device of a plurality of viewer devices connects to the content creator device via a first broadcast platform of the plurality of broadcast platforms, and at least a second viewer device of the plurality of viewer devices connects to the content creator device via a second broadcast platform of the plurality of broadcast platforms;

responsive to a selection operation on the chat container, selecting one or more broadcast platforms of the plurality of broadcast platforms as a target broadcast platform; and responsive to a messaging operation on the chat container, sending a content creator message to at least one viewer device among the plurality of viewer devices, wherein the at least one viewer device is in communication with the content creator device via the target broadcast platform, wherein the chat container is configured to display the content creator message, a text message of the user of the first viewer device from the first broadcast platform, and a text message of the user of the second viewer device from the second broadcast platform, and wherein the chat container is further configured to display, only to the content creator device, VIP status for the user of the first viewer device or the user of the second viewer device, the VIP status indicating to the content creator device that the user of the first viewer device or the user of the second viewer device, respectively, has achieved a particular score based on cumulative tips given.

2. The method of claim 1, wherein the content creator device is connected to a database storing first information pertaining to a user of the first viewer device on the first broadcast platform and storing second information pertaining to a user of the second viewer device on the second broadcast platform and the first and second information are retrieved from the database and displayed within the chat container, and wherein the chat container includes an element for entering information that is additionally stored in the database for subsequent retrieval and display within the chat container.

3. The method of claim 2, wherein the content creator device is configured to broadcast a video stream and send content creator messages to the plurality of viewer devices via at least one of the plurality of broadcast platforms, and each of the plurality of the viewer devices is configured to watch the broadcasted video stream and send the viewer information to the content creator device via at least one of the plurality of broadcast platforms.

4. The method of claim 3, wherein the viewer information includes a comment message, a private message, a tipping message, and statistical data, associated with a particular viewer device among the plurality of viewer devices, wherein the comment message includes a viewer ID, comment content, comment time, and a broadcast platform name corresponding to a particular broadcast platform, among the plurality of broadcast platforms, associated with the particular viewer device;

wherein the tipping message includes the viewer ID, a tipping value, a tipping time, and the broadcast platform name, via which the tipping message is sent; and wherein the statistical data includes a number of viewer devices of the plurality of viewer devices, tipping statistics for the particular broadcast platform of the plurality of broadcast platforms, tipping statistics for the particular viewer device, of the plurality of viewer devices, and identity information for the particular viewer device, of the plurality of viewer devices.

5. The method of claim 4, further comprising:
responsive to a reply operation on the comment message or the tipping message in the chat container, a reply message is sent from the content creator device to the at least one viewer device, of the plurality of viewer devices, and is synchronously shown in the particular broadcast platform, of the plurality of broadcast platforms, via which the at least one viewer device is in communication with the content creator device.

6. The method of claim 4, wherein the viewer information further includes an indication that a particular viewer device, of the plurality of viewer devices, is associated with a peripheral device.

7. The method of claim 6, wherein the peripheral device is an adult toy, wherein the adult toy is connected to the particular viewer device by a wired or wireless connection, and the indication includes information pertaining to whether the wired or wireless connection is operational and/or information pertaining to a type of the adult toy.

8. The method of claim 2, wherein in the step of displaying, through the chat container, viewer information from the plurality of broadcast platforms, includes:
responsive to receiving front-end data from the plurality of broadcast platforms, processing the front-end data to obtain the viewer information to be displayed through the chat container; or
receiving the viewer information from the at least one of the plurality of broadcast platforms to the chat container based on a software development kit which interfaces the chat container with the target broadcast platform, wherein the software development kit is integrated into a development of the at least one of the plurality of broadcast platforms.

9. The method of claim 1, wherein the chat container is presented as a floating window on a web page, as an embedded element in a web page, and/or as an independent client application.

10. The method of claim 9, wherein each of the plurality of broadcast platforms is separately displayed on different web pages, and the chat container is presented in one of the web pages for a particular broadcast platform.

11. The method of claim 1, wherein the step of selecting one or more broadcast platforms as the target broadcast platform includes:
based on the target broadcast platform and the content creator message, calling a preprogrammed script to simulate an input operation on a web interface associated with the target broadcast platform, so as to send the content creator message to the target broadcast platform; or
sending the content creator message from the chat container to the target broadcast platform based on a software development kit which interfaces the chat container with the target broadcast platform, wherein the software development kit is integrated into a development of the target broadcast platform.

12. The method of claim 1, wherein the tipping history of the user of the first viewer device includes a total value of all tips given by the user of the first viewer device over a particular time frame.

13. The method of claim 1, wherein the chat container is further configured to display a username of the user of the first viewer device, a representation of the first broadcast platform that the first viewer device is connected to the content creator device through, and a tipping history of the user of the first viewer device proximate to the display of the text message of the user of the first viewer device, and
wherein the chat container is further configured to display a username of the user of the second viewer device, a representation of the second broadcast platform that the second viewer device is connected to the content creator device through, and a tipping history of the user of the second viewer device proximate to the display of the text message of the user of the second viewer device.

14. The method of claim 1, wherein the messaging operation further includes selecting a particular user among the user of the first viewer device or the second viewer device as a target user and sending private message to the target user.

15. A system for communication across multiple broadcast platforms, including:
a control server for connecting to a first broadcast platform, a second broadcast platform, and generating a chat container;
a content creator terminal for displaying the chat container, generating a live stream broadcast, transmitting the live stream broadcast to each of the first and second broadcast platforms, and transmitting a content creator message to a target broadcast platform, wherein the chat container is configured to input the content creator message and select the target broadcast platform from among the first and second broadcast platforms;
a first viewer terminal connected to the first broadcast platform and configured to receive the generated live stream broadcast therethrough and further configured to receive the content creator message when selected as the target broadcast platform; and
a second viewer terminal connected to the second broadcast platform and configured to receive the generated live stream broadcast therethrough and further configured to receive the content creator message when selected as the target broadcast platform, and
wherein the chat container is further configured to display, only to the content creator device, VIP status for a user of the first viewer terminal or a user of the second viewer terminal, the VIP status indicating to the content creator device that the user of the first viewer terminal or the user of the second viewer terminal, respectively, has achieved a particular score based on cumulative tips given.

16. The system of claim 15, the content creator terminal is further configured to receive viewer information from the first broadcast platform and/or the second broadcast platform through the chat container, wherein the viewer information is associated with at least one viewer device in communication with the content creator device via at least one of the first broadcast platform and/or the second broadcast platform.

17. The system of claim 15,
wherein the system further comprises a database connected to either the control server or the content creator terminal and configured to store and retrieve the first and second database entry as well as the tipping histories of the first and second users.

18. The system of claim 15, wherein the first and second database entries are each represented by an icon within the chat container.

19. The system of claim 15, wherein the first and second database entries include a history of tips made within a predetermined time period, subscription participation information, or VIP status information.

20. The system of claim 15, wherein the first and second database entries include a history of tips made within a predetermined time period across multiple different broadcast platforms including the first broadcast platform and the second broadcast platform.

21. The system of claim 15, wherein the tipping history of the user of the first viewer device includes a total value of all tips given by the user of the first viewer device over a particular time frame.

22. A non-transitory computer-readable medium storing a program including instructions that, when executed by a processor, causes communication to be processed across multiple broadcast platforms, by:
   providing a chat container in a user interface of a content creator device, wherein the chat container is configured to provide centralized information management across a plurality of broadcast platforms, and wherein at least a first viewer device of a plurality of viewer devices connects to the content creator device via a first broadcast platform of the plurality of broadcast platforms, and at least a second viewer device of the plurality of viewer devices connects to the content creator device via a second broadcast platform of the plurality of broadcast platforms;
   responsive to a selection operation on the chat container, selecting one or more broadcast platforms of the plurality of broadcast platforms as a target broadcast platform; and
   responsive to a messaging operation on the chat container, sending a content creator message to at least one viewer device among the plurality of viewer devices, wherein the at least one viewer device is in communication with the content creator device via the target broadcast platform,
   wherein the content creator device is connected to a database storing first information pertaining to a history of tips provided by a user of the first viewer device to the content creator within a predetermined time period and storing second information pertaining to a history of tips provided by a user of the second viewer device to the content creator within the predetermined time period and the first and second information are retrieved from the database and displayed within the chat container as lists of tips given within the predetermined time period along with total values of the tips given,
   wherein the chat container is configured to display the content creator message and a text message of a user of the at least one viewer device, and
   wherein the chat container is further configured to display, only to the content creator device, VIP status for the user of the first viewer device or the user of the second viewer device, the VIP status to the content creator device indicating that the user of the first viewer device or the user of the second viewer device, respectively, has achieved a particular score based on cumulative tips given.

23. The non-transitory computer-readable medium according to claim 22, wherein the instructions, when executed by the processor, further cause:
   displaying, through the chat container, viewer information from the plurality of broadcast platforms, wherein the viewer information is associated with at least one viewer device in communication with the content creator device via at least one of the plurality of broadcast platforms.

24. The non-transitory computer-readable medium according to claim 23, wherein:
   the viewer information includes a comment message, a private message, a tipping message, and/or statistical data,
   wherein the comment message includes a viewer ID, comment content, comment time, and/or a name of a particular broadcast platform, among the plurality of broadcast platforms, via which the comment message is sent;
   wherein the tipping message includes the viewer ID, a tipping value, a tipping time, and/or the name of the particular broadcast platform, among the plurality of broadcast platforms, via which the tipping message is sent; and
   wherein the statistical data includes a number of viewer devices of the plurality of viewer devices, tipping statistics for the particular broadcast platform of the plurality of broadcast platforms, tipping statistics for a particular viewer device, of the plurality of viewer devices, and/or identity information for a particular viewer device, of the plurality of viewer devices.

25. The non-transitory computer-readable medium according to claim 22, wherein the tipping history of the user of the at least one viewer device includes a total value of all tips given by the user of the at least one viewer device over a particular time frame.

* * * * *